United States Patent Office 3,518,900
Patented July 7, 1970

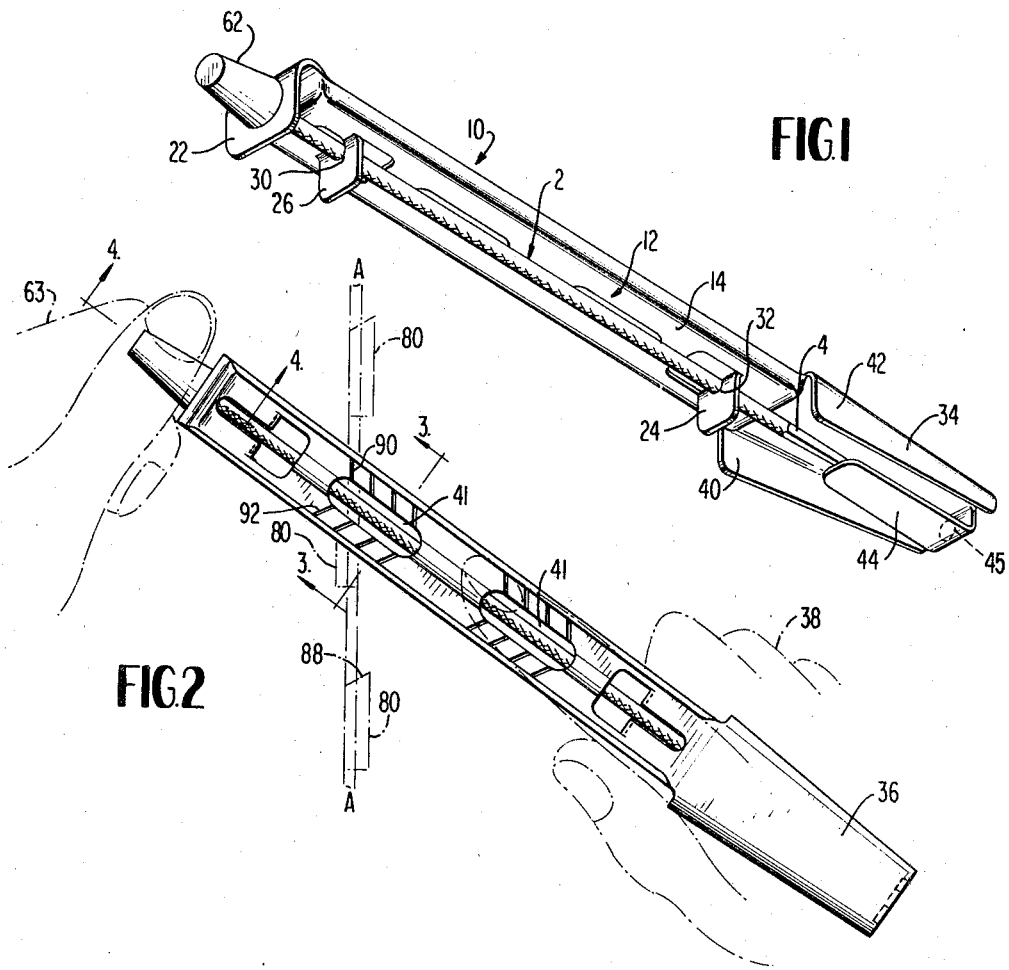
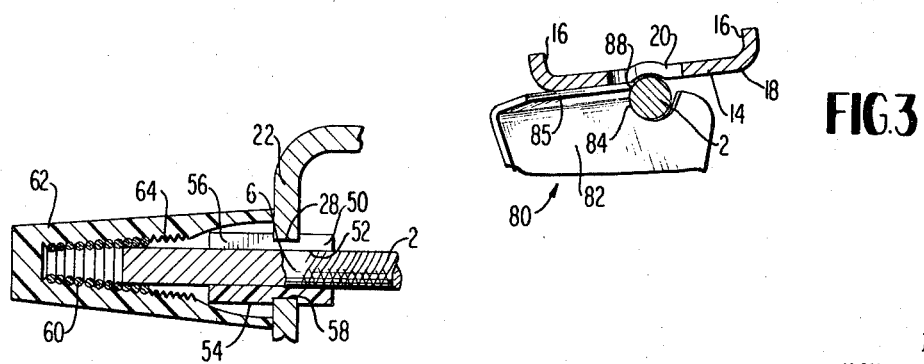

3,518,900
HOLDER FOR A ROUND FILE, PARTICULARLY SUITABLE FOR USE IN SHARPENING A CHAIN SAW
Jack William Ehlen, Torrance, William Lavier Gasner, Gardena, and Donald Samse, Playa del Rey, Calif., assignors to McCulloch Corporation, Los Angeles, Calif., a corporation of Wisconsin
Filed Aug. 27, 1968, Ser. No. 755,525
Int. Cl. B23d 63/08
U.S. Cl. 76—36                            10 Claims

ABSTRACT OF THE DISCLOSURE

A holder for a round file, which is particularly suitable for use in sharpening a cutter tooth of a saw chain. The holder includes a longitudinally extending, rigid body adapted to overlie the file in abutting contact therewith along at least a portion of the file length. Connecting means releasably connects the file with the body. The connecting means is further adapted to mount the file for rotation about the longitudinal axis thereof relative to the body. A handle is fixedly connected with one longitudinal end of the body and is adapted to be grasped by one of a user's hands for manual reciprocation of the file in a longitudinal direction. Turning means adapted for releasable connection with an end of the file adjacent the other end of the body is adapted to be grasped by the other of the user's hands. The user is thereby enabled to rotate the file about its longitudinal axis relative to the file body while the file is being reciprocated, or between reciprocation strokes, thus providing an improved cutting and clearing action for the file.

BACKGROUND OF INVENTION

This invention relates to a holder for a round file. In particular, the invention relates to a holder for a round file, which is particularly suitable for use in sharpening a cutter tooth of a saw chain. However, the invention may be utilized in many other applications.

In many filing applications involving the use of a round file on a workpiece, it is necessary to maintain the file in particular orientation to the workpiece to achieve a desired result. A typical situation of this type arises in the sharpening of a cutter tooth of a saw chain.

Such cutter teeth are usually formed of metal, with each tooth having a tooth body extending upwardly generally in the plane of the saw chain and a laterally extending, generally horizontal top plate extending along an upper extremity of the tooth body. Upwardly extending and lateral cutting edges are formed on the forward edges of the tooth body and top plate respectively. In sharpening the cutting edges of the cutter tooth by use of a round file, it is necessary to accurately position the round file in order to avoid distortion of the upwardly extending cutting edge profile. In addition, the file must be inclined accurately at a correct transverse angle of inclination to the plane of the saw chain to insure that the file traverses the lateral cutting edge correctly.

In view of the obvious difficulties involved in manually holding a simple, round file in the correct disposition to sharpen a cutting tooth, it has heretofore been proposed to provide various forms of file holder which cooperate with the cutting tooth structure to provide a gauging action locating the round file in the correct orientation.

Typically, such prior file holders (see for example Penberthy U.S. Pat. No. 3,327,567) have included some form of rigid body adapted to be fixedly secured to a conventional round file to extend along and spaced above the file. The file holder is usually provided with at least one flat face disposed in a plane parallel to the longitudinal axis of the round file, so that the round face may be rested upon the top plate of the cutting tooth to act as a gauging surface locating the round file in correct vertical location to the vertical cutting edge of the tooth.

This simple arrangement may, however, prove unsatisfactory under certain circumstances for a variety of reasons. For example, the surface of the round file facing toward the cutting tooth may become clogged with metal filings during use. In this event, it is usually necessary to cease filing while the holder is readjusted to permit clearing of the file, and in order to rearrange the file to present a fresh portion of the file face to the cutting tooth. Although it has been previously proposed to provide a round file mounted for rotation about its longitudinal axis relative to the file holder (see for example Irwin U.S. Pat. No. 2,833,165), such prior devices have made no provision for direct positive rotation of the round file by the operator while he is actually reciprocating the file linearly across the cutter tooth being sharpened.

Another disadvantage may arise with the prior art arrangements above described, as the round file is not afforded any direct support against transverse deformation of the median portion of the round file. However, it is well known to persons who have used such files for sharpening cutting teeth, that the sideward pressure exerted on the round file to force it against the cuting edges of he cutting tooth may often be sufficient to cause sideward deformation of the round file. If such sideward deformation occurs, the file is no longer suitable for cutting an accurate profile on the tooth.

OBJECTS AND SUMMARY OF INVENTION

It is therefore a general object of the invention to provide a holder for a round file, intended to obviate or minimize problems of the type generally noted above.

It is a particular object of the invention to provide a holder for a round file of the type adapted to be linearly reciprocated manually during use, wherein the file may be positively rotated by the user during reciprocation both to clear the file and also to provide an improved cutting action.

It is another object of the invention to provide a holder for a round file for use in applications where the file is subjected to transverse loading, wherein support for the file to resist sideward deformation of the file is provided.

A holder for a round file, constructed in accordance with a preferred embodiment of the invention is intended to accomplish at least some of the foregoing objects. The file holder includes a longitudinally extending, rigid body adapted to overlie the file in abutting contact with adjacent, upper peripheral portions of the file along at least a portion of the length of the file. Connecting means connected with the body is adapted to releasably connect the file with the body. The connecting means is further adapted to mount the file for rotation about the longitudinal axis thereof relative to the body. A handle fixedly connected with one longitudinal end of the body is grasped by one of a user's hands for manual reciprocation of the body in the longitudinal direction. Turning means is adapted for releasable connection with an end of the file adjacent the other end of the body. The turning means is adapted to be grasped by the other of the user's hands for rotation of the file about the longitudinal axis thereof relative to the body during reciprocation thereof.

It will be appreciated that the combined reciprocating and turning action imparted to the file in this manner provides an enhanced cutting action for the file. It is also significant that the rotation effected, permits the file to be cleared of filings while in use, thus obviating problems caused by clogging of the file.

In a further aspect of the invention, the body includes a downwardly facing, flat, lower or gauging surface disposed in a first plane parallel to a longitudinal axis of the file. A longitudinally extending, generally arcuate, recessed portion in the lower surface partially receives the file. The recessed portion bears against adjacent upper peripheral portions of the file to support the file and to resist sideward deformation of the file transversely of its longitudinal axis. However, this recessed portion functions as an arcuate bearing which does not substantially impede file rotation. First and second support members are fixedly connected with the body adjacent the opposite longitudinal ends of the body. Each support member extends about and underlies adjacent portions of the file to hold the file against the recessed portion while enabling rotation of the file about the longitudinal axis thereof.

The recessed parts of the body resist sideward deformation of the round file even despite relatively high transverse loading imposed upon the round file during, for example, sharpening of the cutting edges of a cutting tooth.

Additional support for the file against lateral deformation is also provided directly by the support members.

THE DRAWINGS

A holder for a round file according to a preferred embodiment of the invention, is illustrated in the accompanying drawings in which, FIG. 1 is a perspective view of a holder for a round file, constructed in accordance with one preferred embodiment of the invention;

FIG. 2 is a top view of the holder shown in FIG. 1 with the holder being shown grasped by a user's hands during use of the tool to sharpen a cutting tooth of a saw chain;

FIG. 3 is a cross-sectional end view of the holder shown in FIG. 2 taken along the lines 3—3 therein;

FIG. 4 is a cross-sectional side view of a portion of the holder shown in FIG. 2 taken along the lines 4—4 therein.

DETAILED DESCRIPTION

Referring to FIG. 1 of the drawings, a holder for a round file 2, constructed in accordance with a preferred embodiment of the invention, is there shown.

The round file 2 is a conventional, commercially available round file having a serrated, longitudinally extending rod-like body of uniform diameter along its serrated portions. At a rearward end, the file 2 is provided with a tang 4 of the usual type. At the opposite forward end, the file is provided with a plain, unserrated portion 6 (FIG. 4) terminating at the extreme forward end of the file.

To support the file for use, the file 2 is mounted in a file holder 10 (FIG. 1) which includes a rigid body 12. The body 12 comprises a longitudinally extending, generally flat, central sheet portion 14 (FIG. 3) having two outwardly directed flanges 16 bent upwardly along its transverse edges for stiffening purposes. The file 2 extends longitudinally beneath a flat lower surface 18 of the central portion 14 and is positioned transversely centrally thereof.

To provide transverse support for the file 2 to assist it in resisting lateral deformation when subjected to sideways forces, the upper peripheral portions of the file 2 are partially received within a longitudinally extending, generally arcuate, recessed bearing portion 20 formed integrally in the central portion 14 of the rigid body. Although only a minor arcuate segment of the file periphery is received within the arcuate recess 20, the file is held sufficiently firmly (as will be discussed) against the adjacent surface of the recessed portion 20 to insure that the latter gives significant lateral support to the body of the file 2.

The file 2 is held against the recessed portion 20 by forward and rear support members 22 and 24 respectively, positioned adjacent the forward and rear ends of the body 12, and by an intermediate support member 26 positioned in rearwardly spaced, adjacent relation to the forward support member 22. The front and intermediate support members 22 and 26 spaced along the forward portions of the file 12 provide additional support for the file against any transverse bending movement imposed on the file by lateral pressure of the file against the workpiece. This keeps the file axis straight and concentric with its mountings at the forward end of the file holder, to facilitate easy turning of the file, as will be described. Also, the two, forward and intermediate, support members provide twice the frictional resistance to axial movement of the file provided by the rear support member 26, thereby tending to minimize any axial movement of the file adjacent the front end where turning forces to rotate the file are applied.

The forward support member 22 comprises a flange integral with the forward end of the rigid body 12, curved up and over through 180° to project vertically downwardly below the lower surface of the body 12. Other obvious methods of providing the forward support member may equally be used. The forward support member 22 is spaced closely forward from the forward end of the body 12. The intermediate and rear support members 26 and 24 respectively, comprise cut-out, rectangular tongues bent out of the plane of the central portion 14 to extend perpendicularly downwardly below the body 12.

The support members 22, 26 and 24 are provided with longitudinally aligned, openings 28, 30 and 32, respectively, through which passes the file 2. The underside edges of the openings 30 and 32 in the support members 26 and 24 underlie and abuttingly embrace the adjacent lower peripheral portions of the file 2 to hold its upper peripheral portions against the recessed portion 20.

A handle 34 integral with the rear end of the body 12 projects rearwardly and longitudinally therefrom. The handle 34 includes a horizontal transversely and longitudinally extending flat upper wall 36 (FIG. 2) disposed in a plane parallel to and spaced above the central portion. The handle is shaped to fit comfortably within the palm of one hand 38 of a user. Projecting downwardly and extending longitudinally along the transverse edges of the upper wall 36 of the handle are left and right side flanges 40 and 42.

The left side flange 42 is engaged by the thumb and the ball of the thumb of the user's hand 38 while the right side flange 40 is grasped by the second, third and fourth fingers and adjacent portions of the palm of the user's hand 38. The index finger of the user's hand 38 is extended along the rigid body portion 12 to press downwardly on the upper surface adjacent the longitudinal mid part thereof during the use of the tool.

The user can view the file in use through longitudinally extending openings 41 in the rigid body spaced on opposite sides of the mid point portion of the body on which the user's index finger presses.

It may be desired to protect the user's hand from contact with the tang 4 of the file, which is sometimes provided with rather sharp edges. For this purpose, a portion of the handle may be bent downwardly and back to extend reversely of the tool spaced beneath the tang 4 to form an underlying protective tongue portion 44 which may also serve as a belt clip. A forward opening 45 in the vertical part of the portion 44 is provided to permit the file to be slid through into the openings 32, 30 and 28.

It will be understood that the portions of the tool holder 10 thus far described (comprising the rigid body 12, the support members 22, 26 and 24, and the handle 34) are formed as a one piece, rigid, unit from sheet metal utilizing conventional forming and bending techniques. Preferably, the metal is sheet steel. However, other materials including certain types of plastic, or other metals may equally be utilized.

Adjacent its forward end, the file 2 passes through a nylon bushing 50 (FIG. 4) mounted in and extending through the previously mentioned opening 28 in the front support member 22. Other bushing materials may alternatively be used. The bushing has a central bore 52 of uniform internal diameter snugly embracing the adjacent peripheral portions 6 of the file 2, and an external peripheral surface 54 of greater diameter than the diameter of the opening 28. The bushing 50 is also provided with an axially extending slot 56 and a peripherally extending recess 58 intermediate the axial extremities of the bushing.

In the installation of the bushing 50, it is squeezed together to close the slot 56, thereby reducing the diameter of the external surface 54 to a sufficient extent to permit the bushing to be passed axially through the opening until the peripheral recess 58 is aligned with the edges of the opening 28. The bushing is then allowed to expand back to its former dimensions by its own natural resilience, so that the edges of the opening 28 are received within the recess 58 to thereafter secure the bushing against axial motion relative to the forward support member 22. Any subsequent collapse of the bushing is prevented by insertion of the file 2 through the internal bore 52.

The extreme forward end of the file 2 is threadedly engaged by a self-threading nut in the form of a tapered, coiled, spring wire insert 60 fixedly mounted within the interior of a hollow knob 62. The knob 62 is provided with a forwardly and radially inwardly tapered, threaded portion 64 providing a seat for the threaded insert 60. Alternatively, the threaded wire insert 60 may be omitted with a moulded tapered thread on the interior of the knob 62 being used directly.

Additionally, the knob 62 is externally of frustoconical form having an exterior surface which is ribbed or otherwise roughened to enable it to be grasped between the forefinger and thumb of the other hand 63 of the user of the device, as shown in FIG. 2.

In assembling the file 2 with the holder 10, the file is slid through the bushing 45 and the holes 32 and 30 and then through the bushing 50 until the forward end of the file projects a short distance forwardly of the bushing. The file 2 and the holder 10 are grasped manually together about the body 12 to hold the file against rotation while the knob 62 is threaded onto the end of the file to cause the file to become engaged with the threaded insert 60 as the threaded insert by reason of its tapered form and resilient nature will grippingly engage the end of the file.

The knob and file are then pushed rearwardly into the holder 10 until further rearward motion is prevented by abutment of the rear end of the knob 62 against the forward support member 22, thus locating the file 2 in fixed longitudinal relation to the file holder 10. Alternatively, the file may be located by abutment of internal portions of the knob 62 against the forward end of the bushing 50.

To use the tool, the file handle 34 is grasped in the right hand and the knob 62 grasped in the left hand (FIG. 2). The holder and file are reciprocated with the right hand across a workpiece while at the same time the file 2 is rotated about its longitudinal axis relative to the holder by turning off the knob 62 between the thumb and forefinger of the left hand. With this construction, the file may, if desired, be easily turned through one or more complete revolutions to provide a much greater turning action than, for example, the partial oscillation through less than 360° encountered in the common use of a hand held, plain, round file. A lefthanded user may equally use the tool by grasping the handle in the left hand and the knob 62 in the right.

This combined reciprocating and rotating filing action is of particular value for at least two reasons. Firstly, the rotation enables the file to clear itself of filings during use so that it does not become clogged. Secondly, the rotational shear action of the serrated edges of the file combined with the linear reciprocating action provides a combined cutting action which is particularly effective in removing metal.

One particular application for which the holder of the present invention is particularly suitable is that of sharpening a cutting tooth of a saw chain.

Such a saw chain is illustrated in simplified form in FIG. 2 and includes a plurality of links disposed in a plane A—A of the saw chain. Mounted in the saw chain at intervals spaced therealong are a plurality of cutter teeth 80.

Each cutter tooth (FIG. 3) includes a sheet-like tooth body 82 extending upwardly generally in the plane A—A of the saw chain and provided with a generally arcuate, upwardly extending forward cutting edge 84. The tooth body 82 along its upper extremity is bent over into a generally horizontal, transversely extending top plate 85 having a lateral cutting edge 88 extending rearwardly and transversely away from the plane of the saw chain. The cutting tooth may be of the so-called "hooded" cutter type. The lateral cutting edges of alternate cutter teeth are disposed alternately laterally to the right and left (FIG. 2) of the saw chain.

The file 2 is of the same diameter as the arcuate vertical cutting edge 84 and in use must be located in correct relation to the forward cutting edge 84. In addition, the file 2 must be inclined at the correct transverse angle to the plane of the saw chain A—A to correspond with the lateral and rearward inclination of the lateral cutting edge 88.

To dispose the file 2 in the correct alignment, the lower gauging surface 18 of the rigid body 12 is rested flush on the top plate 85 of the cutting tooth during filing. The dimensions of the file and holder are such as to insure that in this relation, the file is located in correct position to provide a sharpened surface of correct profile on the forward cutting edge 84 of the cutting tooth.

To assure correct transverse alignment of the file with regard to the plane of the saw chain A—A, a plurality of visible markings 90 inclined to the longitudinal axis of the file are provided in the upper surface of the body 12. In use, the markings 90 are aligned longitudinally with the plane A—A, thus ensuring that the file 2 is inclined at the correct predetermined inclination to the plane of the saw chain for sloping the lateral cutting edge 88.

When it is desired to sharpen the next cutting tooth having a lateral edge sloping in the opposite transverse direction from the saw chain, an alternate set of markings 92 provided on the upper surface of the rigid body are utilized.

SUMMARY OF ADVANTAGES

It will be appreciated that in constructing a holder for a round file according to the present invention, certain significant advantages are provided.

In particular, the structure of the holder which mounts the file for linear reciprocation and at the same time provides a knob to permit the file to be positively rotated about its longitudinal axis by the user, allows a combined rotary and linear cutting action to be exerted which is particularly effective. Significantly, the rotary motion imparted to the file during cutting avoids clogging problems by allowing the file to be cleared while linear reciprocation of the file continues uninterrupted.

Also of particular significance is the recessed mounting of the file in the tool body. This recessed mounting stiffens the tool against transverse pressure exerted on the tool and enables it to resist sideward deformation. This is, of course, of particular value in using the tool for sharpening a cutting tooth of a saw chain in which the file is customarily pressed with appreciable sideward pressure against the vertical and lateral cutting edges of the cutting tooth.

In addition, the recessed portion also prevents upward deformation of the file intermediate its ends relative to the file holder.

Other advantages are provided by the rigid construction afforded to the tool, and by the simple structure of the tool holder which is formed in one piece from sheet metal. This provides a particularly low cost and rugged holder.

Although the invention has been described with reference to one preferred embodiment, it will be appreciated by those skilled in the art that numerous additions, deletions, substitutions, modifications and other changes may be made which will fall within the purview of the appended claims.

We claim:

1. A holder for a longitudinally extending round file, the file holder comprising:
   a longitudinally extending, rigid body adapted to overlie the file in abutting contact with adjacent upper, peripheral portions of the file along at least a portion of the length of the file;
   connecting means connected with said body adapted to releasably connect the file with said body, said connecting means further adapted to mount the file for rotation about the longitudinal axis thereof relative to said rigid body;
   a handle fixedly connected with one longitudinal end of said body, said handle adapted to be grasped by one of the user's hands for manual reciprocation of said body in a longitudinal direction; and
   turning means adapted for releasable connection with an end of the file adjacent the other end of said body, said turning means adapted to be grasped by the other of the user's hands for rotation of the file about the longitudinal axis thereof relative to said file body during reciprocation thereof, said turning means being in contact with said body to locate the file longitudinally relative to said body.

2. A holder as defined in claim 1 wherein:
   said body further includes,
      a downwardly facing, flat lower surface disposed in a first plane parallel to the longitudinal axis of the file,
      a longitudinal extending, generally arcuate, recessed portion in said flat lower surface for partially receiving the file, said recessed portion bearing against adjacent upper peripheral portions of the file to support the file and to resist sideward deformation of the file transversely of the longitudinal axis thereof; and
      first and second support members fixedly connected with said body adjacent said one and said other longitudinal ends thereof respectively, each said support member extending about and underlying adjacent portions of the file to hold the file against said recessed portion while enabling rotation of the file about the longitudinal axis thereof.

3. A holder as defined in claim 2 further including,
   at least one longitudinally extending opening in said body extending vertically therethrough to enable the user to view the adjacent portion of the file beneath said body.

4. A holder as defined in claim 2 wherein:
   said second support member includes,
      an opening extending in spaced relation about the periphery of the file;
   and wherein the holder further includes,
      a bushing of low friction material fixedly mounted within said opening in said second support member adapted to extend about the file to support the file for rotation,
   and wherein said turning means further includes,
      engaging means adapted to releasably engage an axially extreme portion of the file spaced outwarly of said bushing, and
      a knob fixedly connected with said engaging means, said knob adapted to be grasped by the user's other hand, portions of said knob bearing axially against said other support member to locate the file longitudinally in relation to said body.

5. A holder as defined in claim 1 wherein,
   said handle includes portions spaced above and below and axially beyond adjacent other end portions of the file to prevent contact of one of the user's hands with the file.

6. A holder as defined in claim 4 wherein,
   said body, said handle and said support members are formed in one rigid piece from sheet metal.

7. In combination with a cutting tooth forming a part of a saw chain, the cutting tooth being of the type having a generally arcuate, upwardly extending, forward cutting edge and a generally horizontal, downwardly and rearwardly inclined top plate having a lateral cutting edge, a hand tool utilized to sharpen the cutting tooth, the hand tool comprising,
   a longitudinally extending, round file,
   a holder for said file, said holder including,
      a longitudinally extending, rigid body adapted to overlie said file in abutting contact with adjacent upper peripheral portions thereof along at least a portion of the length of said file, said rigid body having
         a flat, longitudinally extending, lower surface adapted to rest on the top plate of the cutting tooth to position the file in predetermined relation to the forward cutting edge of the cutting tooth in contact therewith,
      connecting means connected with said body for fixedly connecting therewith said file, said connecting means further mounting the file for rotation about the longitudinal axis thereof relative to said body,
      a handle fixedly connected with one longitudinal end of said body, said handle adapted to be grasped by one of a user's hands for manual reciprocation of said body, in a longitudinal direction thereof; and
      turning means releasably connected with an end of said file adjacent the other end of said body, said turning means being adapted to be grasped by the other of the user's hands for rotation of said file about the longitudinal axis thereof relative to said rigid body, said turning means being in contact with said body to locate said file in longitudinal relation to said body.

8. A combination as defined in claim 7, wherein,
   said body further includes,
      a longitudinally extending, generally, arcuate, recessed portion in said flat face for partially receiving said file, said recessed portion being against adjacent upper peripheral portions of said file to support said file and to resist sideward deformation of the file transversely of the longitudinal axis thereof; and
      first and second support members fixedly connected with said rigid body adjacent the opposite longitudinal ends thereof, each said support member extending about and underlying adjacent portions of said file for holding said file against said recessed portion while enabling rotation of said file about the longitudinal axis thereof.

9. A combination as defined in claim 8 further including,
visual markings on an upper surface of said rigid body adapted to be aligned longitudinally with the saw chain to align the longitudinal axis of said file at a predetermined transverse inclination to the saw chain.

10. A combination as defined in claim 7 further including,
a plurality of openings extending vertically through said body spaced along the length of said file, said openings enabling the user to view the file through said rigid body during use of said file.

References Cited

UNITED STATES PATENTS

| | | | |
|---|---|---|---|
| 3,327,567 | 6/1967 | Penberthy | 76—36 |
| 3,407,466 | 10/1968 | Granberg | 76—25 |

BERNARD STICKNEY, Primary Examiner

U.S. Cl. X.R.

29—78, 80; 76—25